Nov. 8, 1960  I. K. DORTORT  2,959,724
SEMI-CONDUCTOR RECTIFIER SMALL RANGE MAGNETIC CONTROL
Filed Dec. 17, 1958  2 Sheets-Sheet 1
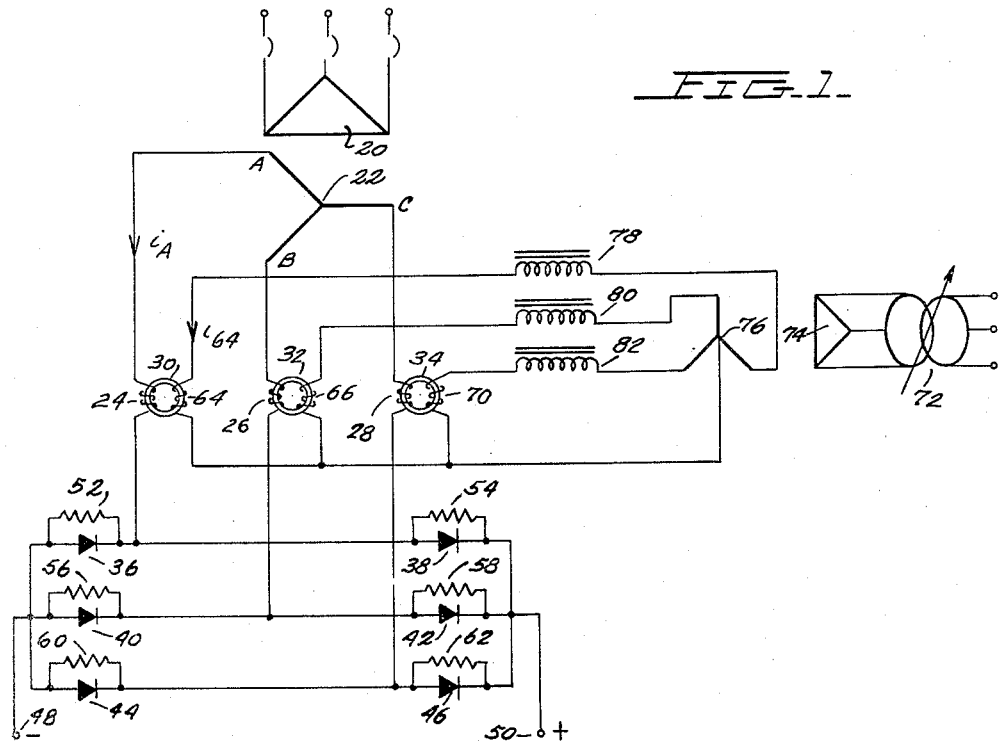
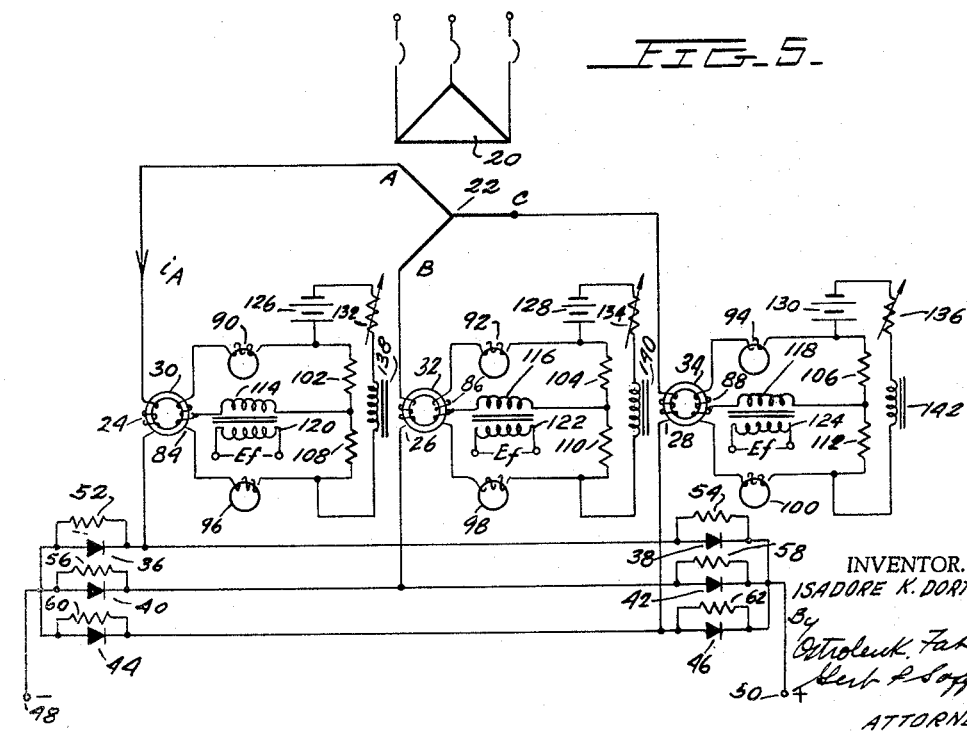
INVENTOR.
ISADORE K. DORTORT
ATTORNEYS Nov. 8, 1960     I. K. DORTORT     2,959,724
SEMI-CONDUCTOR RECTIFIER SMALL RANGE MAGNETIC CONTROL
Filed Dec. 17, 1958     2 Sheets-Sheet 2
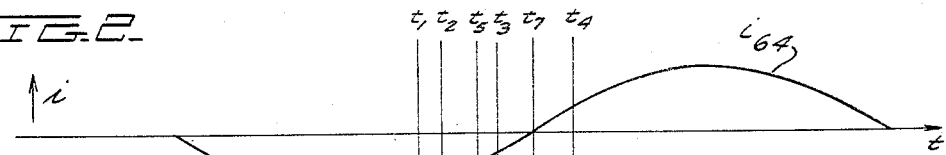
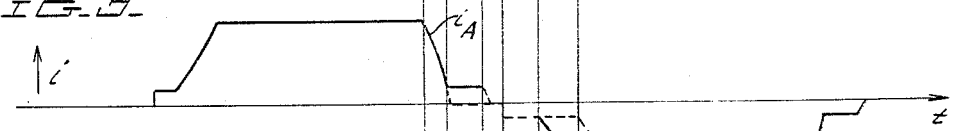
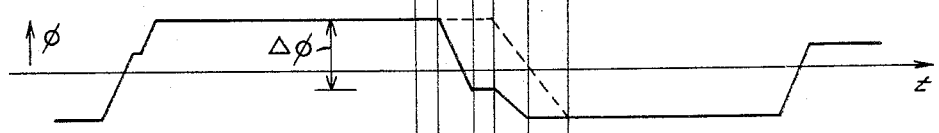
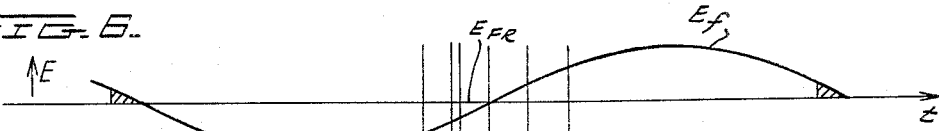
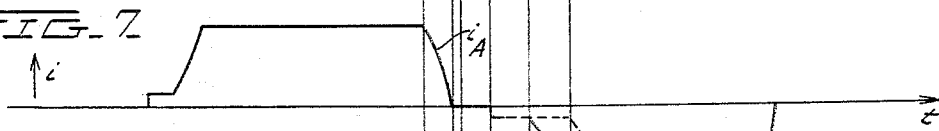
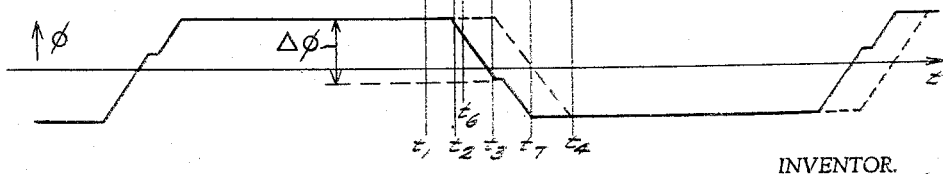
INVENTOR.
ISADORE K. DORTORT
BY
ATTORNEYS United States Patent Office 2,959,724
Patented Nov. 8, 1960

2,959,724

SEMI-CONDUCTOR RECTIFIER SMALL RANGE MAGNETIC CONTROL

Isadore K. Dortort, Philadelphia, Pa., assignor to I-T-E Circuit Breaker Company, Philadelphia, Pa., a corporation of Pennsylvania Filed Dec. 17, 1958, Ser. No. 781,087

14 Claims. (Cl. 321—16)

My invention relates to a magnetic regulation system for semi-conductor type rectifiers.

"Self-saturating" magnetic voltage control for rectifier systems is well known, and it is typically shown in U.S. Patent No. 2,817,805 issued December 24, 1957 entitled Flux Reversal Circuit for Commutating Reactors of Mechanical Rectifiers in the name of Edward J. Diebold, and assigned to the assignee of the instant invention. However, the previously known magnetic control has been utilized only in the "6 coil" type of rectifier connection in which each reactor is connected in series with one "arm" of a rectifier so that the current in the main winding of the reactor is unidirectional.

Prior to the conduction interval of the rectifier element, the flux of the series connected reactor is adjusted to some predetermined value so that when forward voltage is applied across the series connection, there will be a predetermined time delay until the reactor is saturated in its forward direction, and power current conduction begins through the rectifier element.

Clearly, by controlling the flux level prior to the appearance of forward voltage, the amount of flux change remaining till saturation controls the amount of volt-seconds absorbed by the reactor out of the forward voltage wave and, therefore, controls the average voltage transmitted to the D.-C. load. As stated above, it has been previously thought possible to apply such a voltage control system only when each rectifier arm has a respective control reactor.

The principle of my invention is to provide this type of voltage control where the reactors are connected in the A.-C. leads rather than the D.-C. leads, so that each reactor serves both the positive and negative rectifier elements of one A.-C. phase. Accordingly, in a three-phase full wave rectifier system, I require only three saturable type reactors connected in the A.-C. leads for controlling the output voltage of the rectifier, whereas it was previously thought that six saturable reactors would be required in the respective D.-C. leads.

For simplicity I have described and illustrated this system as applied to reactors in the secondary transformer leads of a three-phase bridge rectifier. It is, of course, equally applicable to a single phase bridge rectifier, and also to reactors in the primary side of a rectifier transformer feeding any full wave rectifier such as the double-Y with interphase transformer connection, as long as the connection provides a current-zero of sufficient length to permit manipulation of the reactor flux.

I have found that I can controllably adjust the flux of each reactor prior to current conduction of a diode associated with the reactor by one of three ways, each of which attain the same general result of pre-adjusting the amount of flux change which remains prior to conduction of the diode, and thus, a control of the output voltage of that diode.

The first of these methods is by pre-exciting the reactor so that when current conduction through a diode associated with the reactor is terminating, I add ampere turns from an auxiliary circuit in the manner previously known for pre-excitation of a commutating reactor associated with a contact type rectifier element. In essence, this type of system will induce a so-called break step wherein the current through the outgoing rectifier arm will for a short time maintain a small "forward" value with respect to the diodes, even though the A.-C., or commutating voltage of that arm is now reversed and negative. The net ampere-turns on the reactor have reversed and accordingly the flux of the reactor will begin to change prior to the initiation of power current conduction through the rectifier element of a different polarity and associated with the reactor. The degree of flux reversal may be controlled by using an A.-C. pre-excitation which will decrease below the value required to cause the main circuit to drive the reactor through its entire flux change at some predetermined time so that the amount of phase control may be easily controlled from the phasing or magnitude of the auxiliary excitation. Note that while the "step" current remains positive all of the volt-seconds required to produce the flux change curve from the inverse commutating voltage.

A second type of flux control means is obtained by using an alternating pulse generating type of circuit which generates a voltage pulse during the time interval existing between the end of current conduction of one of the rectifier elements of the other polarity associated with the saturable reactor. This voltage pulse will operate to partially reverse the flux of the reactor prior to conduction of the diode whose output voltage is to be regulated, depending upon the number of volt-seconds contained in the pulse. Pulse generators for generating alternating current pulses having a predetermined width and magnitude are, of course, well known in the art, and may be easily applied to this application.

A third type of auxiliary control means for pre-setting the amount of flux to be reversed prior to current conduction through a diode is of the by-pass type in which the leakage current of the rectifier element, or an intentional leakage circuit permits a sufficient negative current to flow past a diode after the end of its conduction period, so that the required magnetizing current of the reactor is supplied and the reactor flux is partially reversed by some predetermined amount prior to initiation of conduction through the other rectifier element associated with the reactor.

Obviously, these three methods can be combined in varying degrees. For instance, excitation is always combined with some degree of by-pass, since the semi-conductors always have some leakage current and may be by-passed by voltage divider resistors or other devices. If there is enough excitation to maintain the 'break-step" current positive, the action is exactly as described for the first case. If the step current reverses, the commutating voltage is divided between the reactor and the by-pass impedance. The excitation current is smaller, but the step length is increased to provide the same volt-seconds.

Accordingly, a primary object of my invention is to provide a novel flux reversal system for a rectifier utilizing self-saturating reactors.

Another object of my invention is to provide a novel small range regulation system for semi-conductor type rectifiers.

A further object of this invention is to provide a novel voltage control system for semi-conductor rectifiers in which saturable reactors are connected in the A.-C. leads.

A further object of my invention is to provide a novel magnetic voltage control system for rectifiers which includes saturable reactors connected in the rectifier A.-C.

leads which are controlled by a pre-excitation type of circuit which partially reverses the reactor flux prior to current conduction of a rectifier element associated with the reactors.

A further object of my invention is to provide a novel magnetic voltage control system for rectifiers having saturable reactors connected in its A.-C. leads which comprises a voltage pulse generating means which partially reverses the flux of the reactors after the end of a current conduction interval and prior to the beginning of a new forward current conduction interval.

A further object of my invention is to provide a novel magnetic voltage control system for A.-C. reactors of a semi-conductor rectifier which includes by-pass current control means for the rectifier elements to permit a sufficient negative current to flow to satisfy the magnetizing current requirements of the reactors.

These and other objects of my invention will become apparent from the following description when taken in connection with the drawings, in which:

Figure 1 shows a three-phase double-way type of rectifier circuit adapted with saturable reactors in its A.-C. leads which are controlled by a pre-excitation type of control system.

Figure 2 illustrates the pre-excitation current of the pre-excitation control circuit of phase A of Figure 1 as a function of time.

Figure 3 illustrates the current through the main winding of the saturable reactor of phase A of Figure 1 as a function of time.

Figure 4 illustrates the flux density of the reactor core of the reactor of phase A of Figure 1 as a function of time.

Figure 5 shows a second embodiment of my invention wherein the magnetic voltage control is attained by a voltage pulse generating circuit.

Figure 6 illustrates the input voltage of the pulse generator circuit of phase A of Figure 5 as a function of time.

Figure 7 illustrates the current conducted through the main winding of the saturable reactor of phase A of Figure 5 as a function of time.

Figure 8 illustrates the flux density of the reactor core of the reactor of phase A of Figure 5 as a function of time.

Referring now to Figure 1, a typical three-phase two way rectifier circuit is shown wherein the power transformer having a primary winding 20 and secondary winding 22 supplies the power for the rectifier circuit. Transformer secondary 22 is shown as having three phases A, B and C, which are connected in series with windings 24, 26 and 28 respectively of saturable type magnetic cores 30, 32 and 34 respectively. Note that windings 24, 26 and 28 are on the A.-C. side of the rectifier. Reactor winding 24 is then connected in series with negative rectifier element 36 and positive rectifier element 38; winding 26 is connected in series with negative rectifier element 40 and positive element 42; and main winding 28 is connected in series with negative rectifier element 44 and positive rectifier element 46.

It is to be noted that rectifier elements or arms 36 through 46 are shown as being single rectifier elements. Clearly, however, these rectifier elements may be of any type of semi-conductor element wherein a plurality of series or parallel connected elements are used to meet the voltage and current requirements of the system.

Each of negative rectifier elements 36, 40 and 44 are then connected together and taken to a negative terminal 48. In a similar manner, positive rectifier elements 38, 42 and 46 are connected together and taken to the positive terminal 50.

Each of rectifier elements 36 through 46 are further shown to have resistors 52, 54, 56, 58, 60 and 62 connected thereacross. These resistors may be voltage balancing elements, and are assumed to represent, among other things, the leakage current of each of the rectifier elements.

The reactor cores 30, 32 and 34 are shown in Figure 1 to have pre-excitation windings 64, 66 and 70 respectively associated therewith. Windings 64, 66 and 70 are energized from an auxiliary voltage source which includes phase shifter 72 and a transformer with primary winding 74 and secondary winding 76. Secondary winding 76 is a Y connected winding, and has its center connected to the bottom of each of windings 64, 66 and 70. The other side of each of the windings 64, 66 and 70 is then connected to an appropriate phase of winding 76 in series with reactors 78, 80 and 82 respectively.

The operation of the circuit of Figure 1 is best understood from Figures 2, 3 and 4 which illustrate the operation of phase A.

Referring first to Figures 3 and 4, in Figure 3 it is seen that current $i_A$ through positive diode 38 begins to rise and is then limited to some small value which is related to the magnetizing current of core 30 until the core 30 is saturated in a forward direction. The current $i_A$ thereafter rises rapidly to a value determined by the impedance of the D.-C. load, and flows until time $t_1$ where the voltage of phase A is such that the current $i_A$ is driven toward a zero value.

The flux density of the reactor core, and current in phase A under normal conditions, and without any flux control means, is shown in dotted lines in Figures 3 and 4. The current will decrease to a substantially zero value, it being assumed that the leakage current of diode 38 and bypass current of resistor 54 are smaller than the magnetizing current required in winding 24 to cause reversal of the flux of core 30. This condition is shown in Figure 3 beginning at time $t_2$. It will be noted that reactor flux shown in dotted lines in Figure 4 at time $t_2$ does not begin to change. Still assuming no flux control and conditions shown by the dotted lines of Figures 3 and 4, when the phase voltages are such that current conduction is to begin in negative diode or rectifier element 36, the current begins to rise at time $t_3$ until it reaches the relatively low magnetizing current required of reactor winding 24 to unsaturate core 30. Thus, as seen in Figure 4, the reactor flux begins to change from time $t_3$ until the core is saturated at time $t_4$. When the core is saturated at time $t_4$, the current $i_A$ of Figure 3 is no longer limited to the magnetizing current, and, as shown in Figure 3, may rise to its normal value.

As stated above, the essence of my invention is to control the reactor flux so that it is partially reversed prior to time $t_3$, at which current conduction is to begin. By partially reversing this flux, the reactor core 30 will remain unsaturated for a shorter time (the reactor will saturate prior to $t_4$) so that the voltage transferred to the load will be substantially larger than in the case shown in dotted lines in Figures 3 and 4.

The first method in which this control may be achieved is shown in Figure 1 by means of A.-C. pre-excitation circuits which include winding 64 in phase A. The current $i_{64}$ which flows in winding 64 is generally illustrated in Figure 2, and the effect of this pre-excitation current is seen in the solid lines of Figures 3 and 4. At time $t_2$ in Figure 2, it will be seen that the current $i_{64}$ is a substantial negative current. Accordingly, at time $t_2$ the net ampere turns applied to reactor core 30 will have a sufficiently large value to cause a reversal of the flux of core 30, even though the ampere turns from the A.-C. input are in the wrong direction. Hence, as seen in Figure 4, the reactor flux begins to reverse at time $t_2$, and continues to reverse until time $t_5$ at which time the net negative ampere turns supplied by windings 24 and 64 are insufficient to supply the required magnetizing current of core 30. This, in effect, induces a slightly positive type of break step from time $t_2$ to time $t_5$, as shown in Figure 3, as in the case of the pre-excitation of a contact type rectifier commutating reactor.

It is to be clearly understood, however, that in mechanical or contact type of rectifiers which utilize pre-excitation circuits, the pre-excitation is such that it will completely reverse the flux of the core 30.

In the present invention the flux is only partially or controllably reversed, and at time $t_5$, the pre-excitation circuit becomes ineffective and the reactor flux shown in Figure 4 is only reversed by an amount $\Delta\phi$.

When the input voltages are such as to cause conduction through diode 36, the flux of the reactor core 30 begins to reverse once again at time $t_3$, and the remaining flux of reactor 30 is finally reversed at a time $t_7$, as shown in Figures 3 and 4.

Clearly, the unsaturation interval from time $t_3$ to $t_7$ is substantially shorter than the unsaturation interval from time $t_3$ to time $t_4$ that would normally exist in the absence of my novel pre-excitation circuit. Hence, a substantial amount of voltage control is achieved by partially reversing the flux prior to current conduction of diode 36.

Note that for a given A.-C. voltage and a fixed D.-C. current all time points except $t_3$ will vary as the flux reversal is varied. $t_3$ is the instant at which the commutating voltage of arm 36 of the rectifier reverses so as to tend to force forward current through 36. For ease of explanation all other points have been shown fixed, even though they are not. Also, the differences between control and non-control have been shown only in the interval between $t$ and $t_4$, although the entire wave changes.

It will be understood that the remaining phases B and C will operate in an identical manner to that set forth above so that the ultimate D.-C. voltage impressed on output terminals 48 and 50 is controlled.

In order to control the output voltage, it is only necessary to adjust the pre-excitation current $i_{64}$ so that the end of flux reversal at time $t_5$ is controlled. This may be achieved either by adjusting the phase of current $i_{64}$ through the phase control means 72, or, if desired, by controlling the magnitude of current $i_{64}$. In either event, the point at which the net ampere turns required to continue to reverse the flux of core 30 will become insufficient at some controllable time $t_5$.

A second embodiment of my invention is illustrated in Figure 5, where the same rectifier unit of Figure 1 is shown with like numerals identifying similar components.

In the case of Figure 5, however, the flux reversal or flux control circuit is an A.-C. pulse generator for each reactor, rather than the three-phase type of pre-excitation system used in Figure 1. More specifically, the flux reversal circuits of Figure 5 are of the type shown in the above noted U.S. Patent No. 2,817,805 and are connected to center-tapped flux reversal windings 84, 86 and 88. Each end of center-tapped windings 84, 86 and 88 are connected to saturable reactors 90, 92 and 94 respectively at one end, and saturable reactors 96, 98 and 100 at the other end. The opposite end of each of the reactors 90 through 100 are connected to one end of resistors 102, 104, 106, 108, 110 and 112 respectively. Resistors 102—108, 104—110, and 106—112 have their opposite ends connected together, and to one end of transformer secondary windings 114, 116 and 118 respectively.

Each of transformer secondary windings 114, 116 and 118 are energized from a respective primary winding 120, 122 and 124 which have suitable three phase voltages $E_f$ connected thereacross.

A D.-C. source for each of the pulse generators of phases A, B and C is then provided, and includes D.-C. sources 126, 128 and 130 which are connected in series with adjustable resistors 132, 134 and 136 respectively, and reactors 138, 140 and 142 respectively. In the preferred system, all three generators are connected in series to one D.-C. source and control.

Each of the pulse wave generators of Figure 5 will produce a voltage pulse, as illustrated by the cross-hatched areas of Figure 6 for the case of winding 84 of Figure 5. The voltages $E_f$ for each of the phases may, of course, be derived from a three-phase transformer, so that proper phase relationship between phases A, B and C is attained for the pulses, and similarly, the D.-C. control power derived from individual sources 126, 128 and 130 of Figure 7 may be derived from a common source.

The manner in which the pulse generating circuit operates is clearly set forth in the above noted U.S. Patent No. 2,817,805. It is sufficient for purposes of the instant invention to understand that the circuit will generate voltage pulses, as illustrated in Figure 6 in the cross-hatched areas.

The magnitude and pulse width of these voltage pulses will be controlled by control of the D.-C. current drawn from sources 126, 128 and 130, while the phase of the voltages will be controlled from the phase of voltage sources $E_f$.

Accordingly, it is clear that the voltage pulses may be accurately placed with respect to the current conducted by the various diodes, while the volt-seconds contained in the pulses is easily controlled by controlling either a common rheostat or any of adjustable resistors 132, 134 or 136 of Figure 5, or any other well known means of controlling the output of a D.-C. source.

The operation of the system of Figure 5 is best understood by reference to Figures 6, 7 and 8, which illustrate the operation of phase A of Figure 5.

Figure 6 shows the input voltage $E_f$ to the pulse generator with the cross-hatched areas showing the areas at which control voltage is applied to the winding 84.

The dotted lines of Figures 7 and 8 illustrate the manner in which the system operates in the absence of the control circuit, as was the case for Figures 3 and 4 respectively.

In Figure 7 it is seen that the current conducted through diode 54 normally begins to decrease towards zero at time $t_1$. Since it is assumed that there is insufficient negative current to supply the required magnetizing current for core 30 through diode 54, the flux of reactor 30 remains at its previous level, as seen in Figure 8. At a time after $t_2$, and prior to time $t_3$, at which conduction through diode 36 begins, the flux reversal circuit generates a voltage pulse $E_{FR}$, as seen in Figure 6, so that the flux of reactor 30 is reversed by an amount $\Delta\phi$ from the time at which the pulse begins until time $t_3$ at which forward current conduction of rectifier element 36 begins and the voltage pulse $E_{FR}$ ends. $E_{FR}$ may end before or slightly after $t_3$ to suit particular requirements of design.

At time $t_3$ and the beginning of current conduction through valve 36, the remainder of the reactor flux is reversed by the input A.-C. voltage until at time $t_7$ the reactor is saturated and the current, as seen in Figure 7, rises to its load value.

It is to be noted that the flux reversal circuit of Figure 5 causes the current to flow at time $t_7$, which is substantially earlier than time $t_4$ of Figure 7 at which current would normally have begun to flow. Therefore, the A.-C. voltage which is to be applied to the D.-C. load is applied at a substantially earlier time so that the load voltage is increased.

In order to control the amount of flux reversed, and, thus, the time from $t_3$ to $t_7$ in Figure 7, it is apparent that it is only necessary to control the amount of volt-seconds contained in pulses $E_{FR}$ of Figure 6.

The final manner in which the flux of the reactors may be controlled when A.-C. reactors are used has been previously described to be a by-pass control system. In the by-pass control type of system, a sufficient negative current will flow past or through the rectifier element which previously conducted current to satisfy the magnetizing current requirements of the reactor. This type of condition would be similar to that shown in Figure 3 where the current $i_A$ between times $t_2$ and $t_5$ is a reverse current, rather than a forward one. The flux density of the reactor, however, would be identical to that shown in Figure 4.

Thus, a controlled amount of by-pass current is permitted to flow until at time $t_5$ it is made insufficient to continue to drive the reactor through its flux change, and at time $t_3$ in Figures 3 and 4, forward current begins to flow through diode 36, and the remainder of the reactor flux is reversed with a subsequent increase in output voltage over that which would have occurred without the by-pass current control.

Although I have described preferred embodiments of my novel invention, many variations and modifications will now be obvious to those skilled in the art, and I prefer therefore to be limited not by the specific disclosure herein but only by the appended claims.

I claim:

1. A magnetic voltage control system for a two way rectifier; said two way rectifier including an A.-C. phase connected to a positive rectifier element and a negative rectifier element; a reactor; said reactor comprising a core of magnetizable material and a main winding wound on said core; said main winding being connected in series with said A.-C. phase; and control means for controlling the flux of said reactor core; said control means generating ampere turns for said core after the end of power current conduction of said positive rectifier element and before conduction of said negative rectifier element to cause a reversal of flux of said reactor core in the direction in which flux will be reversed when conduction of said negative diode is initiated.

2. A magnetic voltage control system for a two way rectifier; said two way rectifier including an A.-C. phase connected to a positive rectifier element and a negative rectifier element; a reactor; said reactor comprising a core of magnetizable material and a main winding wound on said core; said main winding being connected in series with said A.-C. phase; and control means for controlling the flux of said reactor core; said control means generating ampere turns for said core after the end of conduction of said positive rectifier element and before conduction of said negative rectifier element to cause a reversal of flux of said reactor core in the direction in which flux will be reversed when conduction of said negative diode is initiated; said control means being adjustable to adjust the amount of flux reversed in said reactor core.

3. A magnetic voltage control system for a two way rectifier; said two way rectifier including an A.-C. phase connected to a positive rectifier element and a negative rectifier element; a reactor; said reactor comprising a core of magnetizable material and a main winding wound on said core; said main winding being connected in series with said A.-C. phase; and control means for controlling the flux of said reactor core; said control means generating ampere turns for said core after the end of conduction of said positive rectifier element and before conduction of said negative rectifier element to cause a reversal of flux of said reactor core in the direction in which flux will be reversed when conduction of said negative diode is initiated; said control means comprising an auxiliary A.-C. voltage source and a winding on said core, said auxiliary A.-C. voltage source being connected across said winding and being adjustable in phase with respect to the voltage of said A.-C. phase.

4. A magnetic voltage control system for a two way rectifier; said two way rectifier including an A.-C. phase connected to a positive rectifier element and a negative rectifier element; a reactor; said reactor comprising a core of magnetizable material and a main winding wound on said core; said main winding being connected in series with said A.-C. phase; and control means for controlling the flux of said reactor core; said control means generating volt-seconds and magnetizing ampere turns for said core after the end of power current conduction of said positive rectifier element and before conduction of said negative rectifier element to cause a reversal of flux of said reactor core in the direction in which flux will be reversed when conduction of said negative diode is initiated; said control means comprising an auxiliary pulse voltage source; said pulse voltage source delivering a voltage pulse after the end of the power current conduction of said positive diode.

5. A magnetic voltage control system for a two way rectifier; said two way rectifier including an A.-C. phase connected to a positive rectifier element and a negative rectifier element; a reactor; said reactor comprising a core of magnetizable material and a main winding wound on said core; said main winding being connected in series with said A.-C. phase; and control means for controlling the flux of said reactor core; said control means generating volt-seconds and magnetizing ampere turns for said core after the end of power current conduction of said positive rectifier element and before conduction of said negative rectifier element to cause a reversal of flux of said reactor core in the direction in which flux will be reversed when conduction of said negative diode is initiated; said control means comprising an auxiliary pulse voltage source; said pulse voltage source delivering a voltage pulse after the end of the power current conduction of said positive diode; the volt-seconds of said pulse being adjustable.

6. A magnetic voltage control system for a two way rectifier; said two way rectifier including an A.-C. phase connected to a positive rectifier element and a negative rectifier element; a reactor; said reactor comprising a core of magnetizable material and a main winding wound on said core; said main winding being connected in series with said A.-C. phase; said main winding being connected in circuit relation with respect to said A.-C. phase for controlling the current of said A.-C. phase; said control means generating ampere turns for said core after the end of conduction of said positive rectifier element and before conduction of said negative rectifier element to cause a reversal of flux of said reactor core in the direction in which flux will be reversed when conduction of said negative diode is initiated; said control means being further operative after the end of conduction by said negative rectifier and prior to conduction by said positive rectifier element to cause a reversal of flux of said reactor core in the direction in which flux will be reversed when conduction of said positvie diode is initiated.

7. A magnetic voltage control system for a two way rectifier; said two way rectifier including an A.-C. phase connected to a positive rectifier element and a negative rectifier element; a reactor; said reactor comprising a core of magnetizable material and a main winding wound on said core; said main winding being connected in series with said A.-C. phase; and control means for controlling the flux of said reactor core; said control means generating ampere turns for said core after the end of conduction of said positive rectifier element and before conduction of said negative rectifier element to cause a reversal of flux of said reactor core in the direction in which flux will be reversed when conduction of said negative diode is initiated; said control means being further operative after the end of conduction by said negative rectifier and prior to conduction by said positive rectifier element to cause a reversal of flux of said reactor core in the direction in which flux will be reversed when conduction of said positive diode is initiated; said magnetizable material of said reactor core being of a highly saturable type.

8. A magnetic voltage control system for a three-phase two way rectifier; each phase of said multiphase rectifier including a reactor; each of said reactors comprising a core of magnetic material having a winding thereon; each of said windings being connected in series with a positive rectifier element and with a negative rectifier element; a control means for controlling the flux of said reactor core; said control means including ampere turn generating means for magnetizing said reactor core after the end of conduction by said positive rectifier element to cause at least a partial reversal of flux of said reactor core prior to conduction by said negative rectifier element.

9. A magnetic voltage control system for a three-phase two way rectifier; each phase of said multiphase rectifier including a reactor; each of said reactors comprising a core of magnetic material having a main winding thereon; each of said main windings being connected in series with a respective positive rectifier element and with a negative rectifier element; a control means for controlling the flux of said reactor core; said control means including ampere turn generating means for magnetizing said reactor core after the end of conduction by said positive rectifier element to cause at least a partial reversal of flux of said reactor core prior to conduction by said negative rectifier element; said reactor core magnetic material being of a highly saturable type.

10. A magnetic voltage control system for a three-phase two way rectifier; each phase of said multiphase rectifier including a reactor; each of said reactors comprising a core of magnetic material having a main winding thereon; each of said main windings being connected in series with a respective positive rectifier element and with a negative rectifier element; a control means for controlling the flux of said reactor core; said control means including ampere turn generating means for magnetizing said reactor core after the end of conduction by said positive rectifier element to cause at least a partial reversal of flux of said reactor core prior to conduction by said negative rectifier element; said control means being adjustable to adjust the amount of flux reversed in said reactor core.

11. A magnetic voltage control system for a three-phase two way rectifier; each phase of said multiphase rectifier including a reactor; each of said reactors comprising a core of magnetic material having a main winding thereon; each of said main windings being connected in series with a respective positive rectifier element and with a negative rectifier element; a control means for controlling the flux of said reactor core; said control means including ampere turn generating means for magnetizing said reactor core after the end of conduction by said positive rectifier element to cause at least a partial reversal of flux of said reactor core prior to conduction by said negative rectifier element; said control means comprising an auxiliary A.-C. voltage source and a winding on said core, said auxiliary A.-C. voltage source being connected across said winding and being adjustable in phase with respect to the voltage of said A.-C. phase.

12. A magnetic voltage control system for a three-phase two way rectifier; each phase of said multiphase rectifier including a reactor; each of said reactors comprising a core of magnetic material having a main winding thereon; each of said main windings being connected in series with a respective positive rectifier element and with a negative rectifier element; a control means for controlling the flux of said reactor core; said control means including volt-second generating means and ampere turn generating means for magnetizing said reactor core after the end of conduction by said positive rectifier element to cause at least a partial reversal of flux of said reactor core prior to conduction by said negative rectifier element; said control means comprising an auxiliary pulse voltage source; said pulse voltage source delivering a voltage pulse after the end of the conduction of said positive diode.

13. A magnetic voltage control system for a two way rectifier; said two way rectifier including an A.-C. phase connected to a positive rectifier element and a negative rectifier element; a reactor; said reactor comprising a core of magnetizable material and a main winding wound on said core; said main winding being connected in series with said A.-C. phase; and control means for controlling the flux of said reactor core; said control means generating ampere turns for said core after the end of conduction of said positive rectifier element and before conduction of said negative rectifier element to cause a reversal of flux of said reactor core in the direction in which flux will be reversed when conduction of said negative diode is initiated; said control means being further operative after the end of conduction by said negative rectifier and prior to conduction by said positive rectifier element to cause a reversal of flux of said reactor core in the direction in which flux will be reversed when conduction of said positive diode is initiated; said magnetizable material of said reactor core being of a highly saturable type; the volt-seconds of said pulse being adjustable.

14. A magnetic voltage control system for a two way rectifier; said two way rectifier including an A.-C. phase connected to a positive rectifier element and a negative rectifier element; a reactor; said reactor comprising a core of magnetizable material and a main winding wound on said core; said main winding being connected in circuit relation with respect to said A.-C. phase for controlling the current of said A.-C. phase; and control means for controlling the flux of said reactor core; said control means generating ampere turns for said core after the end of power current conduction of said positive rectifier element and before conduction of said negative rectifier element to cause a reversal of flux of said reactor core in the direction in which flux will be reversed when conduction of said negative diode is initiated.

References Cited in the file of this patent

UNITED STATES PATENTS

| | | |
|---|---|---|
| 2,777,108 | Read et al. | Jan. 8, 1957 |
| 2,817,805 | Diebold | Dec. 24, 1957 |
| 2,860,301 | Diebold | Nov. 11, 1958 |